US012676887B2

(12) United States Patent
Radhakrishnan et al.

(10) Patent No.: US 12,676,887 B2
(45) Date of Patent: Jul. 7, 2026

(54) METHOD AND SYSTEM FOR GENERATING DECOY FILES USING A DEEP LEARNING ENGINE FOR PROTECTION AGAINST RANSOMWARE ATTACKS

(71) Applicant: SOCIETY FOR ELECTRONIC TRANSACTIONS AND SECURITY (SETS), Chennai (IN)

(72) Inventors: Reshmi Thodankannath Radhakrishnan, Chennai (IN); Manivanan Swathi Mithran, Chennai (IN)

(73) Assignee: SOCIETY FOR ELECTRONIC TRANSACTION AND SECURITY (SETS) (IN)

( * ) Notice: Subject to any disclaimer, the term of this patent is extended or adjusted under 35 U.S.C. 154(b) by 425 days.

(21) Appl. No.: 18/120,932

(22) Filed: Feb. 21, 2023

(65) Prior Publication Data

US 2023/0231881 A1 Jul. 20, 2023

(30) Foreign Application Priority Data

Oct. 1, 2022 (IN) .............................. 202241056575

(51) Int. Cl.
*H04L 9/40* (2022.01)
(52) U.S. Cl.
CPC ...... *H04L 63/1491* (2013.01); *H04L 63/1425* (2013.01); *H04L 63/1466* (2013.01)

(58) Field of Classification Search
CPC ............. H04L 63/1491; H04L 63/1425; H04L 63/1466
See application file for complete search history.

(56) References Cited

U.S. PATENT DOCUMENTS

| | | | | |
|---|---|---|---|---|
| 10,523,609 | B1* | 12/2019 | Subramanian | .......... H04L 51/08 |
| 10,757,137 | B1* | 8/2020 | Roturier | ................ G06N 20/00 |
| 11,349,855 | B1* | 5/2022 | Amit | ........................ G06F 9/547 |
| 12,184,693 | B1* | 12/2024 | Eliav | ........................ H04L 63/20 |
| 2009/0026753 | A1* | 1/2009 | Simske | ................ B42D 25/405 |
| | | | | 283/114 |
| 2013/0251145 | A1* | 9/2013 | Lowans | ................ H04L 9/0891 |
| | | | | 380/44 |
| 2018/0248896 | A1* | 8/2018 | Challita | ................ G06F 21/554 |
| 2022/0044130 | A1* | 2/2022 | Golconda | ................ G06N 5/04 |
| 2022/0179964 | A1* | 6/2022 | Qiao | ...................... G06F 21/577 |
| 2022/0277140 | A1* | 9/2022 | Rhim | .............. G06V 30/19013 |
| 2023/0056471 | A1* | 2/2023 | Sambamoorthy | ..... G06F 21/604 |

(Continued)

OTHER PUBLICATIONS

IN Patent Examination Report dated Feb. 15, 2023 as received in Application No. 202241056575.

(Continued)

*Primary Examiner* — Maung T Lwin
*Assistant Examiner* — Mudasiru K Olaegbe

(57) ABSTRACT

A system and method for generating decoy files for protection against ransomware attacks is disclosed. The system includes a deep learning engine, wherein the deep learning engine is configured to extract a plurality of features from most recently used user files in a folder, convert the plurality of features to a vector format, estimate error of the plurality of features to a target vector, and generate decoy files if the error is less than a predefined threshold.

9 Claims, 7 Drawing Sheets

(56) References Cited

U.S. PATENT DOCUMENTS

2023/0262073 A1 *  8/2023  Sheu .................... G06F 21/6218
                                                        726/23
2023/0362194 A1 *  11/2023  Lai ...................... H04L 63/1491

OTHER PUBLICATIONS

Berrueta, E. et al., "A Survey on Detection Techniques for Cryptographic Ransomware," IEEE Access, vol. 7, pp. 144925-144944 (2019).

Oz, H. et al., "A Survey on Ransomware: Evolution, Taxonomy, and Defense Solutions," ACM Computing Surveys, (2022).

IN Office Action dated Jan. 28, 2025 as received in Application No. 202241056575.

* cited by examiner

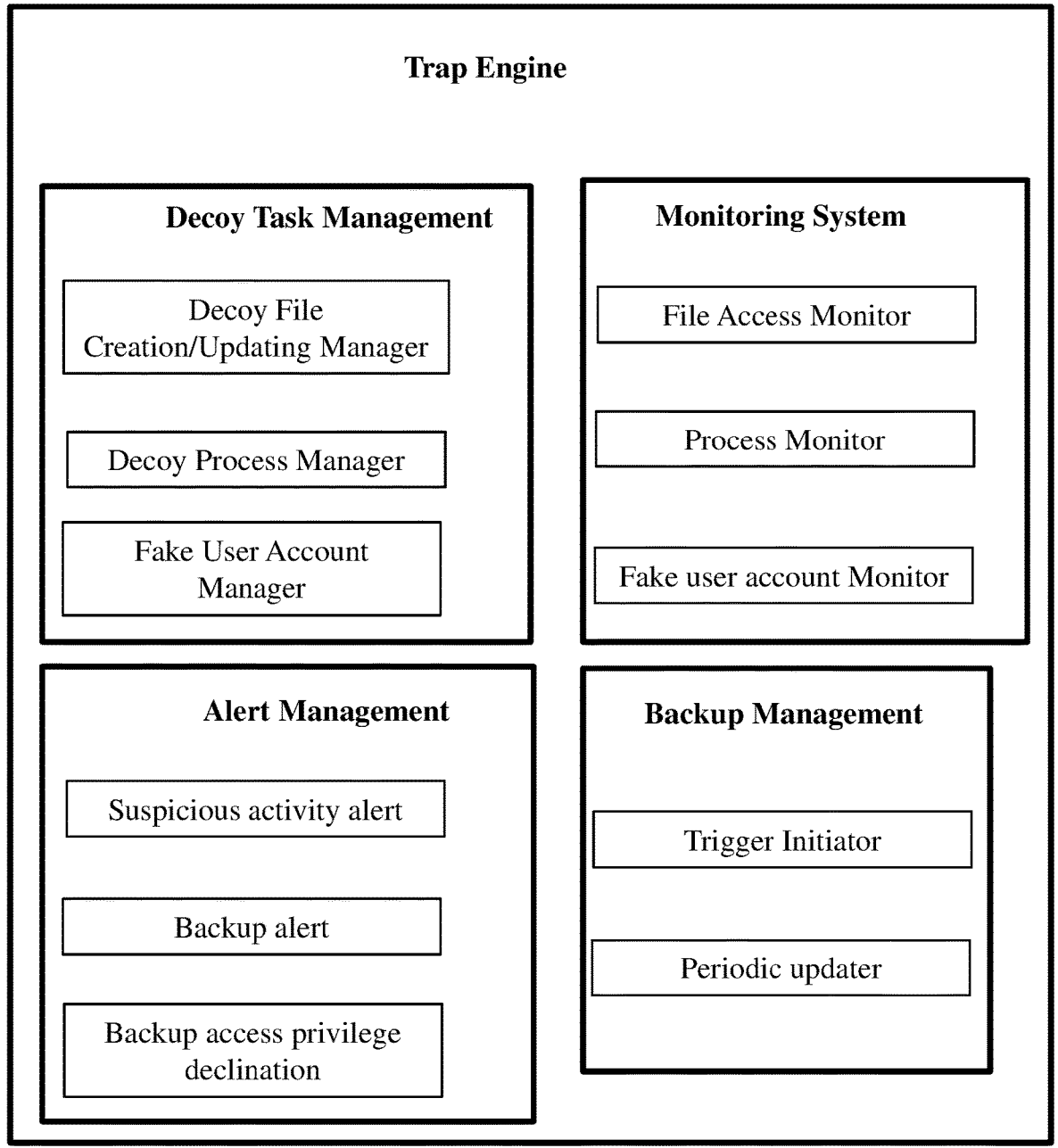

Trap Engine

Decoy Task Management

Decoy File Creation/Updating Manager

Decoy Process Manager

Fake User Account Manager

Monitoring System

File Access Monitor

Process Monitor

Fake user account Monitor

Alert Management

Suspicious activity alert

Backup alert

Backup access privilege declination

Backup Management

Trigger Initiator

Periodic updater

FIGURE 5

605 start

610 extract a plurality of features from most recently used user files in a folder

615 convert the plurality of features to a vector format

620 estimate error of the plurality of features to a target vector

625 generate decoy files if the error is less than a predefined threshold

630 stop

METHOD AND SYSTEM FOR GENERATING DECOY FILES USING A DEEP LEARNING ENGINE FOR PROTECTION AGAINST RANSOMWARE ATTACKS

FIELD OF THE INVENTION

The present disclosure generally relates to system security and more specifically relates to a method and system for preventing ransomware attacks using a deep learning engine.

BACKGROUND OF THE INVENTION

Ransomware is a malware that holds resources or data by encryption and demand ransom for releasing resources or for sharing the keys used for encryption. Existing tools or techniques for identifying and protecting ransomware are generally categorized as Malware analysis tool, Sandbox for binary analysis, Ransomware detectors, Ransomware recovery tools and End-point security.

Based on the attack vectors used in the identified variants of Ransomware, there are many solutions designed for identifying and preventing Ransomware attacks on file servers.

Antivirus engines currently in market identify Ransomware if it does one or more of the following operations: encrypt the files, change Master Boot Record (MBR), delete files, steal information, and escalate privilege. The Ransomware accesses the file metadata from MBR, and new values are inserted to deny access or delete the files. So, canary files, also referred to as decoy files, are used by Anti-Ransomware software to monitor the file activities in directories or folders. But Ransomware variants are intelligent to identify decoy files from user files using various techniques. So very often this technique fails to identify Ransomware.

Dynamic analysis tools are used for testing files by executing and studying the behaviors in virtual environments. This helps to analyze and categorize the file as benign or malicious. Recent attacks prove that malicious files sense the virtual environment and doesn't exhibit its true behavior in virtual environment. Hence these files are also concluded as genuine.

The cryptographic algorithms used for encryption in Ransomware are different. The methods for the analysis and detection of these algorithms are broadly classified as:

1. Static: These are used to detect the crypto binary functions prior to their execution. It performs heuristic analysis such as presence of loops, entropy, high ratio of bitwise operations etc. These techniques exploit crypto constants for analysis and data flow graph to aid in detection of signature of symmetric key crypto algorithms.

2. Dynamic: These can learn the crypto algorithms during runtime. The abnormal usage of API calls for read, write, create file, rename file etc. hints the Ransomware attacks. The attacks hosted by new variants of Ransomware have proven to bypass these analysis and detection techniques. There are several techniques used to analyze the compiled binaries and identify the cryptographic modules. The avalanche effect of input on output is one way to understand the perturbation built. Assessing the aggregation of contiguous memory accesses from input and output parameters is another methodology used in this analysis. The code obfuscation methods used by the Ransomware authors challenge the detection of Ransomware by these techniques.

Controlled Folder Access (CFA) whitelisting is one method with which Ransomware attacks can be prevented. CFA allows only trusted applications to access documents and files in specified locations. Current attacks show that the trusted applications are used as the infection vector by the Ransomware authors. These applications are attested as trusted by the trusted party without knowing the malicious interference in the application hosted by them.

The filesystem is a strategic point for monitoring the typical Ransomware activity as per the survey. The Ransomware checks the commonly used filename extensions to launch attacks. Some Ransomware looks for a specific local file and if not found will exit without encrypting the files. It is seen in current attacks, the shadow copies (local/remote) are also encrypted by the Ransomware. Hence the chance of attack recovery with backups is highly impossible. The fileservers used in an organization are more prone to Ransomware attacks as the file storage act as the primary storage and periodic backups are done on these servers. Hence more Ransomware attacks are targeted on fileservers.

BRIEF SUMMARY OF THE INVENTION

This summary is provided to introduce a selection of concepts in a simple manner that is further described in the detailed description of the disclosure. This summary is not intended to identify key or essential inventive concepts of the subject matter nor is it intended for determining the scope of the disclosure.

An objective of the present disclosure is to deploy a deep learning engine to predict malicious attempts to corrupt file servers and prevent ransomware attacks.

Another objective of the present disclosure is to protect the file servers and bring back to normalcy in the event suspicious attacks and ransomware attacks are detected.

The present disclosure discloses a method of generating decoy files using a deep learning engine for protection against ransomware attacks. The method comprises extracting a plurality of features from most recently used user files in a folder by the deep learning engine and converting the plurality of features to a vector format. Further, the method comprises estimating error of the plurality of features to a target vector. The method comprises generating decoy files by the deep learning engine if the error is less than a predefined threshold.

The present disclosure discloses a system for generating decoy files in a file server for protection against ransomware attacks. The system comprises a processor and a memory communicatively coupled to the processor. The memory comprises a deep learning engine that triggers functional blocks of trap layer as and when required for the operations to be carried out. The deep learning engine is configured to extract a plurality of features from most recently used user files in a folder, convert the plurality of features to a vector format, estimate error of the plurality of features to a target vector, and generate decoy files if the error is less than a predefined threshold.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE FIGURES

The disclosure will be described and explained with additional specificity and detail with the accompanying figures in which:

FIG. 5 illustrates functional blocks of a trap engine, in accordance with one embodiment of the present disclosure;

Figure 1:
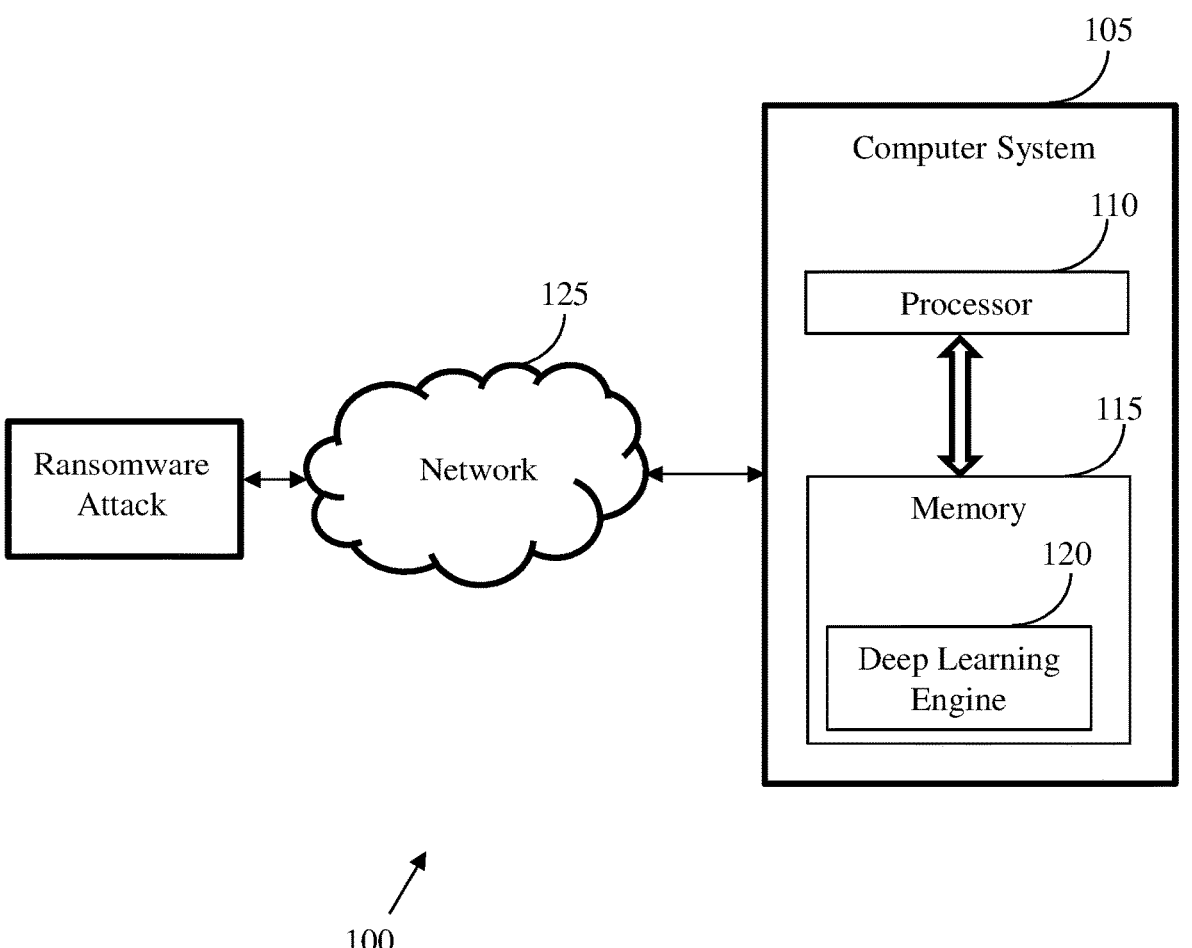
FIG. 1 illustrates an environment for deploying a deep learning engine, in accordance with an embodiment of the present disclosure.

Further, persons skilled in the art to which this disclosure belongs will appreciate that elements in the figures are illustrated for simplicity and may not have been necessarily drawn to scale. Furthermore, in terms of the construction of the system having deep learning engine, it may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprise", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The components, methods, and examples provided herein are illustrative only and not intended to be limiting.

Often, file servers and computer systems are susceptible to ransomware attacks. Disclosed herein is a method and system for enhancing security in file servers and computer systems and protecting the servers and computers from ransomware attacks. The philosophy behind the method and system disclosed herein is to deploy decoy files and misdirect malicious and ransomware attacks from corrupting the original files in the system.

FIG. 1 illustrates an environment 100 for deploying a deep learning engine, in accordance with an embodiment of the present disclosure.

The environment 100 depicts ransomware attack on a computer system 105 over a network 125. The system 105 can be a standalone file server, cloud server, a computer, a laptop, or any computing system which stores files in a folder format. The system 105 generates decoy files for protection against ransomware attacks. The system 105 includes a processor 110 and a memory 115. The memory 115 is communicatively coupled to the processor 110. The memory 115 stores a deep learning engine 120, wherein the deep learning engine 120 is configured to extract a plurality of features from most recently used user files in a folder, convert the plurality of features to a vector format, estimate error of the plurality of features to a target vector, and generate decoy files if the error is less than a predefined threshold.

Existing variants of ransomware have techniques to differentiate original files from decoy files (canary files) by calculating entropy. To calculate the entropy of a file, the frequency of all ASCII (0-127) and extended ASCII characters (128-255) in a file is counted and use the probability in the Shannon's entropy formula. In Shannon's entropy calculation, the entropy value of range 1 to 8 shows the distribution of bytes across the file. The entropy value predicts the next character in the file based on the previous character. It is known that entropy or randomness of decoy files are larger than the normal files or original files. In other words, normal files or un-compressed files have low entropy values compared to compressed or generated files.

Referring to the deep learning engine 120, it is configured to perform many functions. The deep learning engine 120 calculates entropy of the user files and generates decoy files having matching entropy of the user files. Further, the deep learning engine 120 is configured to trigger creation of decoy processes, wherein decoy process does the accessing of decoy files randomly and making it appear as recently accessed files to misdirect ransomware attacks. Further, the deep learning engine 120 is configured to update the decoy files periodically to deceive malicious process triggered by ransomware attacks. Furthermore, the deep learning engine 120 is configured to trigger creation of fake user accounts with administrator rights to misdirect ransomware attacks. When a ransomware attacks decoy files, the deep learning engine 120 is triggered to alert trap layer functional blocks and take further actions to prevent the files in the system 105 is undertaken. The deep learning engine 120 is further explained in FIG. 2.

Figure 2:
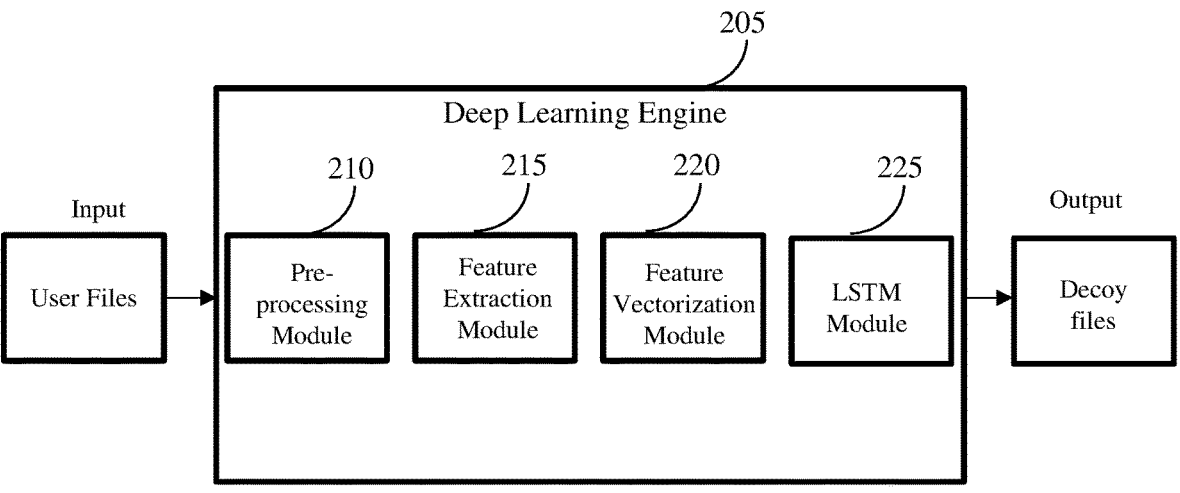
FIG. 2 illustrates a deep learning engine, in accordance with an embodiment of the present disclosure.

FIG. 2 illustrates a deep learning engine 205, in accordance with an embodiment of the present disclosure. The deep learning engine 205 includes a pre-processing module 210, a feature extraction module 215, a feature vectorization module 220, a Long Short-Term Memory (LSTM) module 225. The deep learning engine 205 receives user files as input and provides decoy files as output.

The pre-processing module 210 retrieves user files or original files. The pre-processing module 210 also provides pre-processed dataset retrieved from internet or any external sources. The feature extraction module 215 extracts a plurality of features from most recently used user files in a folder. The plurality of features includes, but not limited to file names, position of files in each folder, file size, date of modification, date of creation, size, author, heading, number of paragraphs, frequency of used Named Entities (NE), and categories of Named Entities.

The feature vectorization module 220 converts the plurality of features to a vector format. The extracted features are converted to vector format using vectorization tools like, for example, spacy, word2vec etc. The vectorized features are used to generate decoy files using LSTM neural network model managed by the LSTM module 225.

The LSTM module 225 estimates error of the plurality of features to a target vector. Error is calculated by determining the entropy of the original file to a decoy file being generated. The LSTM neural network is trained using pre-processed dataset containing documents scraped from internet. The model is trained using the features extracted from the extracted dataset.

LSTM module 225 generates decoy files if the error is less than a predefined threshold. The predefined threshold is the desired entropy of the decoy files. Decoy files are generated using LSTM (Long Short-Term Memory) neural network using the most recently used user files in a folder. Whenever there is a change in the file or periodically the decoy file will be updated to deceive the malicious process. The updates and access to the decoy files is carried out using the decoy process initiated by the decoy user created for this purpose.

Figure 3:
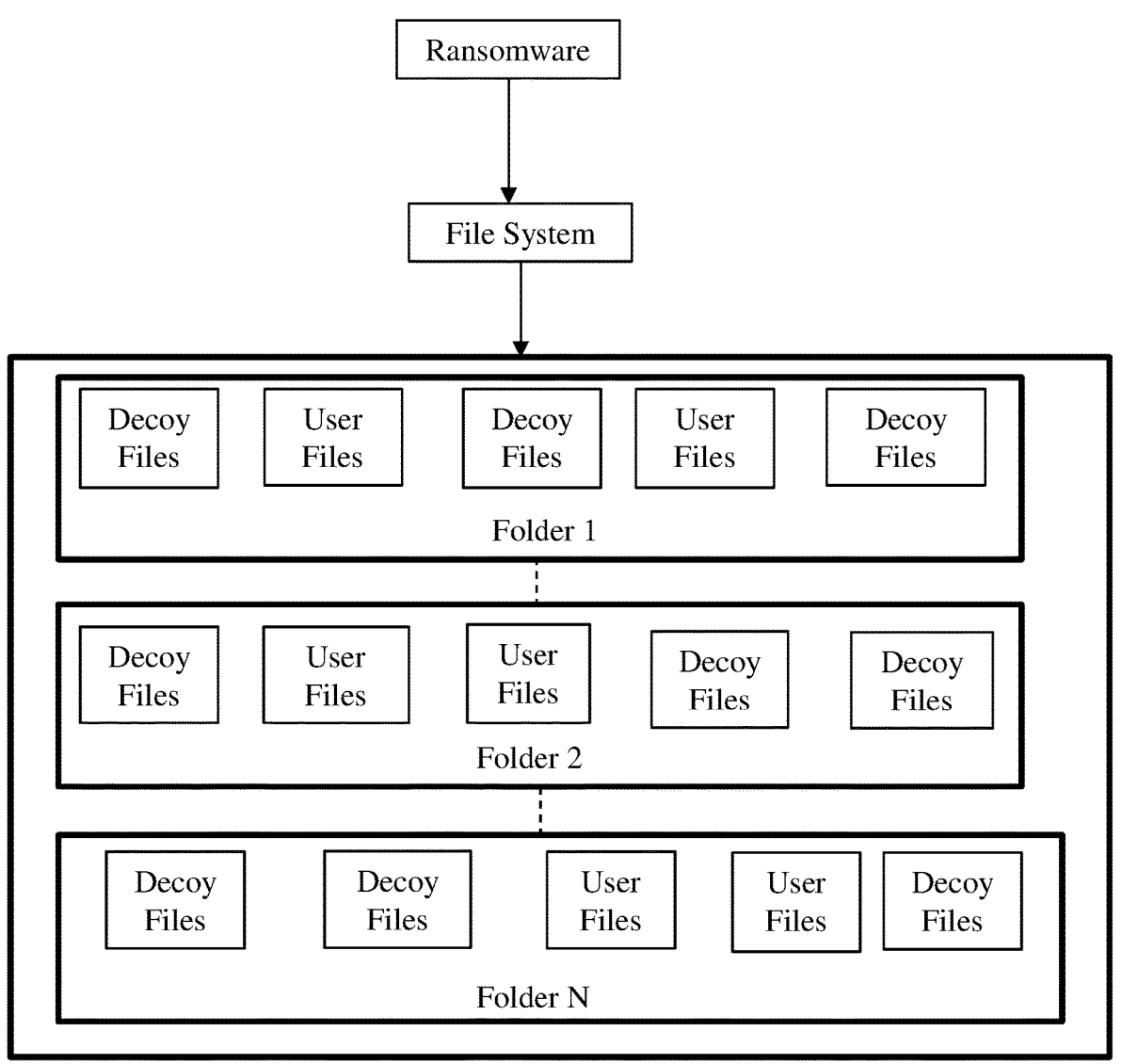
FIG. 3 illustrates a trap layer implementation in a security enhanced file server deployed with the deep learning engine, in accordance with an embodiment of the present disclosure.

FIG. 3 illustrates a trap layer implementation in a security enhanced file server deployed with the deep learning engine, in accordance with an embodiment of the present disclosure. A trap layer is implemented on file system that make use of decoy files, decoy processes, and fake user accounts to identify the ransomware infection. The objective is to create a trap layer over the file system of the server (or a computer) and get hints of Ransomware attacks in its initial stages of infection. It is known that the recent accessed or created files are the targets in the Ransomware infection. Hence to make the decoy files as recently accessed files, the decoy processes are created. The Ransomware attackers create backdoors and login with administrative rights for launching attacks. So, the fake user accounts with admin rights are also configured to trap these type of Ransomware attacks. Moreover, the suspicious activities are alerted, and file backups are triggered to control the spread of infection. The methodology in which the decoy files are created, file contents are generated, files are deployed, file names are created, file size are decided and the accesses to these files are modeled using deep learning engine implemented with deep learning techniques. These deep learning techniques with which decoy files are generated and updated challenge the Ransomware attacker to differentiate original files from decoy files and ends up in getting trapped quickly.

Figure 4:
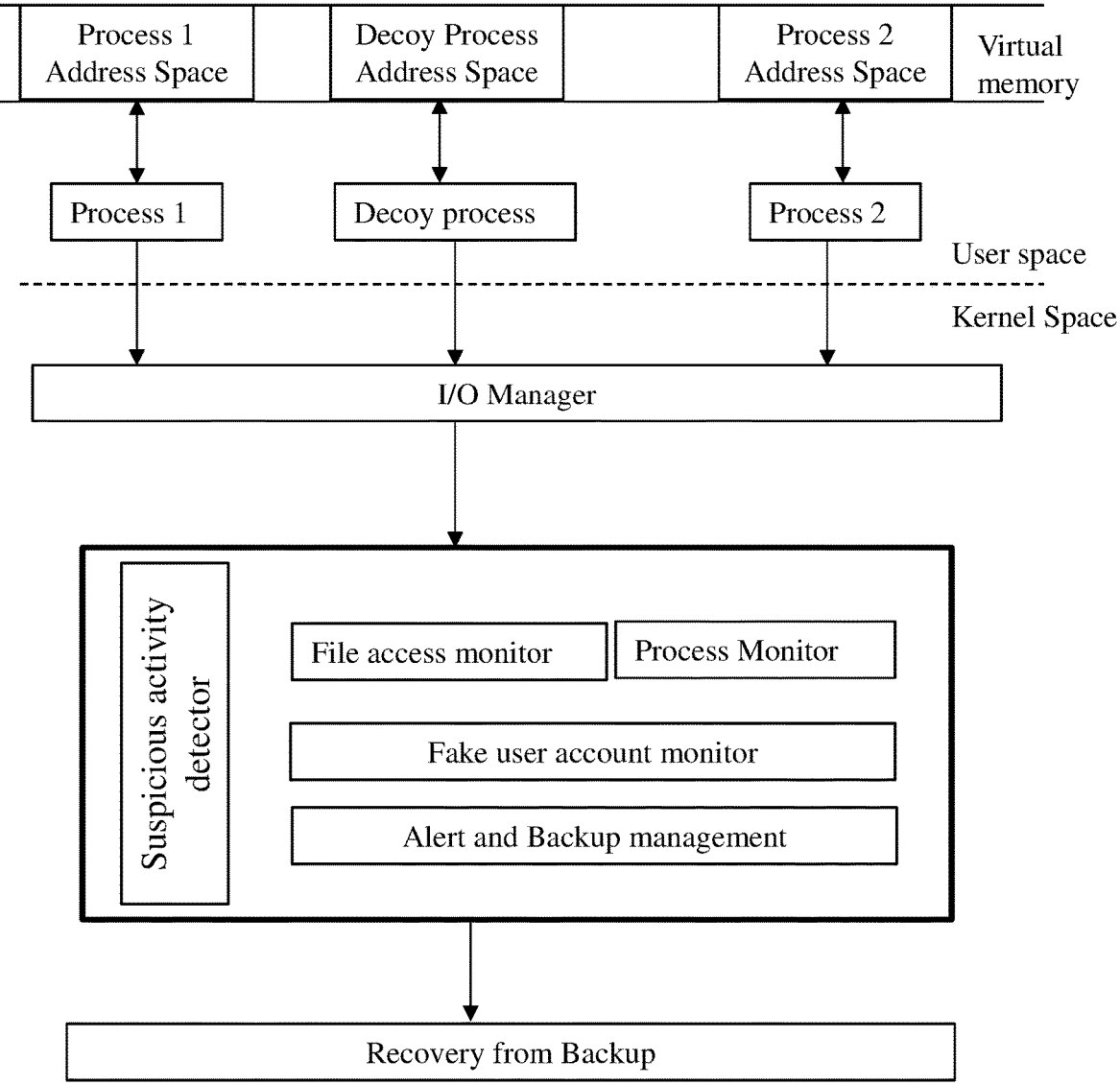
FIG. 4 illustrates an architecture of security enhanced file server, in accordance with one embodiment of the present disclosure.

FIG. 4 illustrates an architecture of security enhanced file server, in accordance with one embodiment of the present disclosure.

The file server can be segregated into user space and kernel space. The decoy task management module in trap layer comprises decoy file manager, decoy process manager and fake user account manager. Trap layer in runtime detects Ransomware attacks in its early stages and thereby stop the spread of infection in the file system to keep both local files and backup files safe. The trap layer can be employed in any operating system file systems and make it immune to Ransomware attacks. Internally there is a suspicious activity detector which tracks the behavior of user account usages, file operations, process calls, etc. Hence prevention and backup procedures will be undertaken to revoke the infection. The methods used for various operations in trap layer is detailed below:

1. The decoy files in the trap layers are not generated randomly as like in existing methods, the deep learning models are used to profile the existing folder structure and file contents and then generate the decoy files. So, the file content in the decoy files resembles the user files with the same entropy. In one embodiment, to avoid privacy issues, only 5% of the user file contents are extracted from the recently used user files to create decoy files.

2. The file traversal methods used in the Ransomware scanning phase is well studied and the decoy files are planned to be placed in all the possible locations where the scanning and action will be initiated. For example, like Windows 1252 or reverse of Windows 1252, Random search etc.

3. The decoy files are given names and deployed in various locations based on the other files' names and positions in each folder. To increase the probability of staging the infection in the decoy files before the user files, scanning possibilities on the file listing methods like date of modification, date of creation, size, author, name etc. are considered and decoy files are created, updated, named, and deployed in the trap layer.

4. The files targeted by Ransomware are generally:
   i. Microsoft Office files (.doc, .docx, .xls, .xlsx, .ppt, .pptx, .rtf)
   ii. Open Office files (.odt, .ods, .odp)
   iii. Adobe PDF files
   iv. Popular image files (.JPG, .PNG, raw camera files, etc.)
   v. Text files (.txt, .RTF, etc.)
   vi. Database file (.sql, .dba, .mdb, .odb, .db3, .sqlite3, etc.)
   vii. Compressed file (.zip, .rar, .7z)
   viii. Mail files (.pst)
   ix. Key files (.pem, .crt, etc.)
   So, decoy files of the above extensions are created and deployed in different locations.

5. The deep learning models also profile the trap layer with decoy files of different sizes.

6. The decoy processes are created to open, read, write, and update the files in random with some inputs from applications or external devices.

7. The decoy files in same or different folder will have different content, different name, different size and different access time.

8. The fake user accounts with admin rights are created to trap Ransomware that approach through backdoors with escalated privileges to infect the fileserver and access the files.

9. Whenever there is a suspected Ransomware infection identified by the changes of content, rename or deletion of decoy files by processes, the notifications and alarms are triggered. Simultaneously the backup manager initiates the fresh backups of benign files and also do complete freezing of previous versions of backups by declining the access privileges.

The suspicious activity detector is a monitoring system which is a trained model to detect malicious or Ransomware activities based on the changes in decoy files, file operation calls and processes invoked. The Input Output Request Packets (IRPs) exchanged between the user space applications and the file systems are monitored to understand the behavioral patterns. The file operations on decoy files deployed in the trap layer to detect the Ransomware infection is the prime focus of the suspicious activity detector. The other patterns of file operation requests like read files, write files, rename files, list files etc. are also monitored to sense the malicious behaviors. The processes invoked to do the file operations are also classified and monitored to see the behavior of the application which invoked the process as benign or malicious. The continuous log analysis of IRPs, file operations and processes in the kernel space is used by the suspicious activity detector. The updating of files in the folders are continuously monitored in the kernel space and if the file updates are above a threshold, the decoy files are also updated.

Both the trap layer and suspicious activity detector used for in security enhanced fileserver use trained deep learning models. The deep learning model in trap layer are trained to generate content for decoy files, create decoy files, update decoy files, and deploy decoy files based on the user files already existing in each folder. The deep learning model used in the suspicious activity detector are trained with logs of entropy values of file system operations, IRPs, processes invoked from clean and infected fileservers. The trained models at runtime decide and classify activities in live system are benign or infected with Ransomware. If the malicious activities are identified, alerts are triggered to the backup management application and the notifications are sent to the user. The backup manager revokes the file operations and also do needful steps for safeguarding the backup by declining the access privilege to the backup files.

FIG. 5 illustrates functional blocks of a trap engine, in accordance with one embodiment of the present disclosure. There are four functional blocks triggered by the deep learning engine, i.e., Decoy task management, monitoring system, alert management, and backup management.

Decoy task management involves decoy file creation and updating. The Decoy file creation/updating manager module will be responsible for creation and updating the decoy files periodically or triggered by changes in user files and folders. The decoy process manager creates decoy processes, wherein decoy process includes accessing decoy files randomly and making it appear as recently accessed files to misdirect ransomware attacks. Fake user account manager creates fake user accounts with administrator rights to misdirect ransomware attacks.

The monitoring system functional block includes file access monitor for monitoring file access, a process monitor to monitor the processes, and a fake user monitor to monitor malicious user accounts.

The alert management functional block is responsible for suspicious activity alert, backup alert, and backup access privilege declination.

The backup management functional block includes trigger initiator to trigger backups and periodic updater to update backup files periodically.

Initially the decoy file creation/updation/updating manager triggers deep learning engine for generation of the first level decoy files as shown in FIG. 2 using the current user files. When the file system update happens, the decoy file creation/updation/updating manager in trap engine triggers the deep learning engine by giving the updated files as input. Whenever new decoy files are generated the decoy file creation/updation/updating manager is triggered to place the decoy files as shown in FIG. 3. To deceive the ransomware by showing the decoy file as recently accessed files, the LSTM module 225 (of FIG. 2) in deep learning engine triggers the decoy process manager in Trap engine to create decoy processes.

Figure 6:
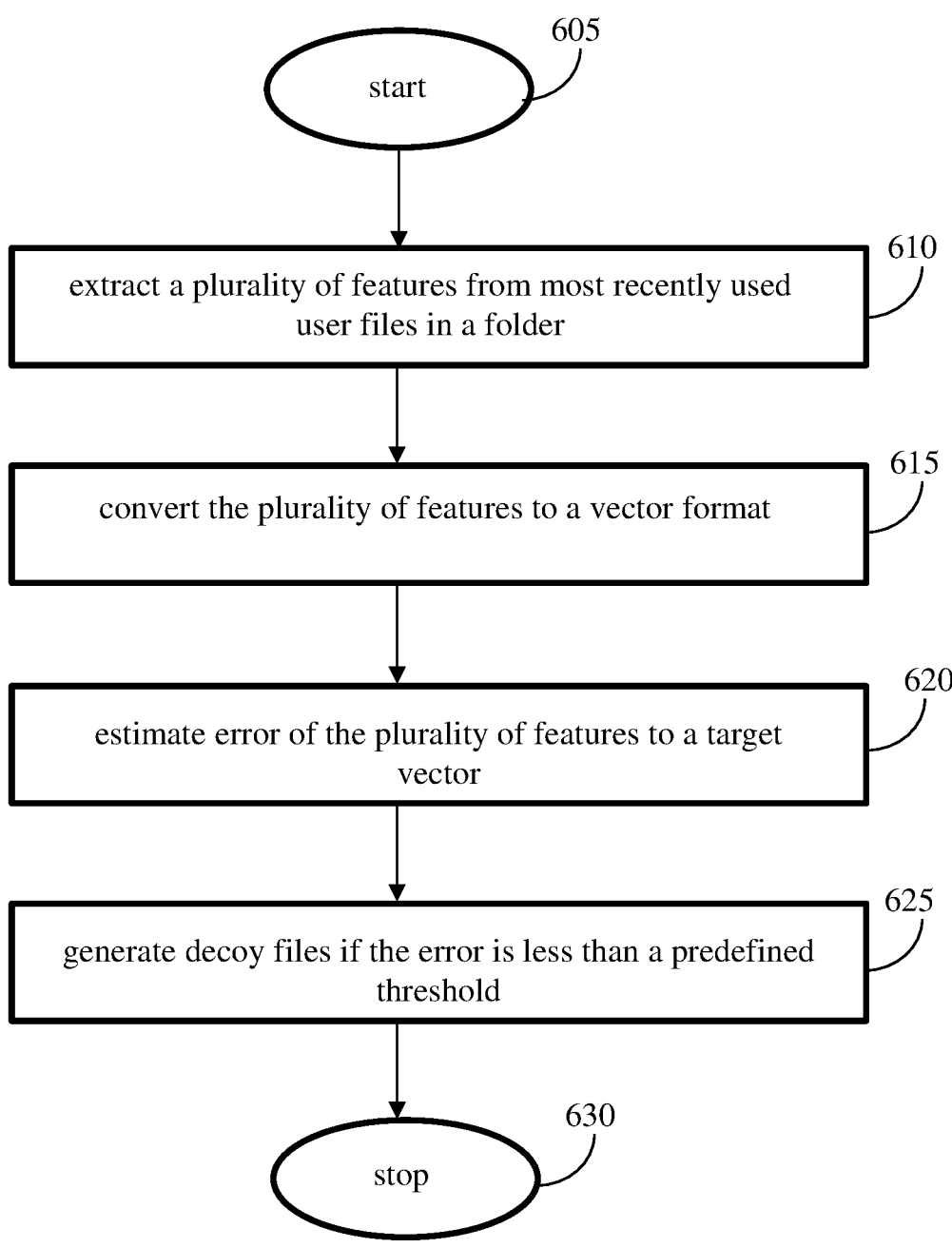
FIG. 6 is a flow diagram illustrating a method of generating decoy files using a deep learning engine, in accordance with one embodiment of the present disclosure.

FIG. 6 is a flow diagram illustrating a method of generating decoy files using a deep learning engine, in accordance with one embodiment of the present disclosure.

The method begins at step 605.

Step 610 includes extracting a plurality of features from most recently used user files in a folder by the deep learning engine. The plurality of features includes at least one of file names, position of files in each folder, file size, date of modification, date of creation, size, author, heading, number of paragraphs, frequency of used Named Entities (NE), and categories of Named Entities. The files are at least one of, but not limited to .doc, .docx, .xls, .xlsx, .ppt, .pptx, .rtf, .odt, .ods, .odp, PDF, .JPG, .PNG, raw camera files, .txt, .RTF, etc., .sql, .dba, .mdb, .odb, .db3, .sqlite3, .zip, .rar, .7z, .pst, .pem, and .crt files.

Step 615 includes converting the plurality of features to a vector format. The vectorized features are used to generate decoy files using LSTM neural network model.

Step 620 includes estimating error of the plurality of features to a target vector. The LSTM neural network estimates error of the plurality of features to a target vector. Error is calculated by determining the entropy of the original file to a decoy file being generated. The LSTM neural network is trained using pre-processed dataset containing documents scraped from internet. The model is trained using the features extracted from the extracted dataset.

Step 625 includes generating decoy files by the deep learning engine if the error is less than a predefined threshold. The predefined threshold is the desired entropy of the decoy files. Decoy files are generated using LSTM neural network using the most recently used user files in a folder. Whenever there is a change in the file or periodically the decoy file will be updated to deceive the malicious process. The updates and accesses to the decoy files is carried out using the decoy process initiated by the decoy user created for this purpose. Generating decoy files by the deep learning engine includes calculating entropy of the user files and creating decoy files having matching entropy of the user files.

The method includes creating decoy processes by the deep learning engine, wherein decoy process comprises accessing decoy files randomly and making it appear as recently accessed files to misdirect ransomware attacks. Further, the method includes updating the decoy files periodically by the deep learning engine to deceive malicious process triggered by ransomware attacks. The method includes creating fake user accounts with administrator rights by the deep learning engine to misdirect ransomware attacks. The method includes implementing a trap layer on file system that make use of decoy files, decoy processes, and fake user accounts to identify the ransomware infection. The method also includes runtime suspicious behavior monitoring for identifying ransomware attack, wherein the monitoring includes alerting on detection of suspicious activity and triggering rollback mechanism wherein file backups are initiated to control spread of infection to other files or backups.

The method ends at step 630.

Figure 7:
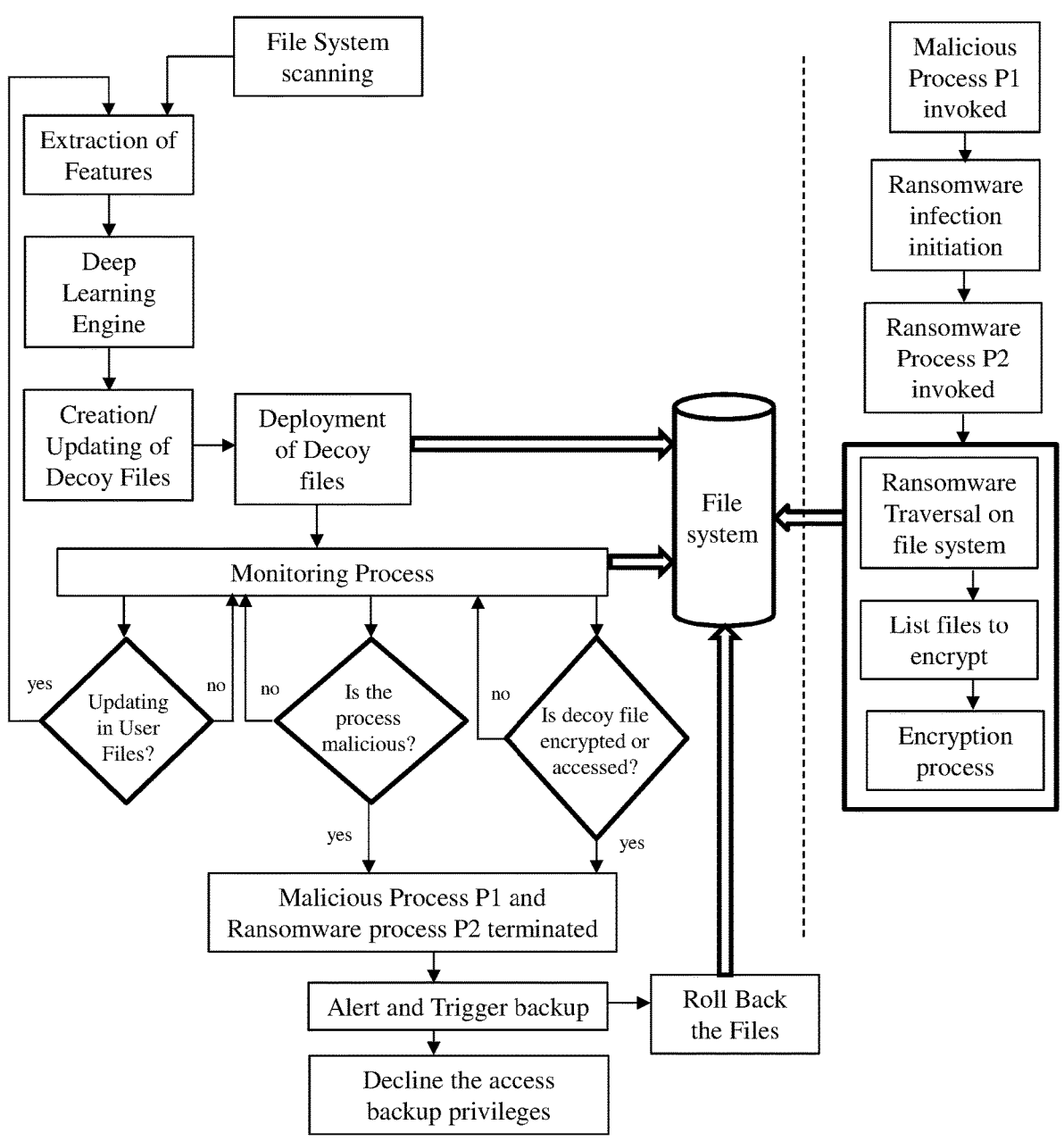
FIG. 7 is a flowchart illustrating steps undertaken by the deep learning engine during ransomware attacks, in accordance with one embodiment of the present disclosure.

FIG. 7 is a flowchart illustrating steps undertaken by the deep learning engine during ransomware attacks, in accordance with one embodiment of the present disclosure.

The deep learning engine initiates scanning of files in the file system. The deep learning engine extracts features of existing files and creates decoy files for every original file present in the file system. The decoy files are deployed in a trap layer in the file system.

A continuous monitoring process happens in the background. The monitoring process checks whether there is any updating of user files in the normal course, i.e. updates done by the user. If yes, i.e. there is file updating, then the features of the updated files are extracted, and decoy files are updated. If there is no updating, monitoring process is continued.

Assuming a malicious process P1 is invoked, then initiation of ransomware infection will happen and ransomware process P2 will be invoked. The ransomware process will traverse the files system, list files to encrypt, and begins infecting the file system. At this instance, the monitoring process detects suspicious activity. If the monitoring results in detection of malicious process, then malicious Process P1 and Ransomware process P2 are terminated. If the monitoring process does not detect malicious activity, then the monitoring is continued. Further, if the monitoring process detects decoy files are encrypted or accessed, then the malicious Process P1 and Ransomware process P2 are terminated. If the monitoring process does not detect encryption or access of decoy files, then the monitoring is continued.

Upon termination of malicious Process P1 and Ransomware process P2, the system alerts and triggers backup. Roll back of original files to the file system is initiated. Further, the system declines access to backup privileges thereby protecting the file system from further infection of the ransomware.

It is to be noted that the method and system disclosed herein is not limited to servers but can be deployed in any system wherein ransomware attacks can corrupt the files within the system. The deep learning engine enhances the security in fileservers and addresses the limitation of high probability failures in early-stage detection of Ransomware attacks.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method of generating decoy files using a deep learning engine for protection against ransomware attacks, the method comprising:

extracting, by the deep learning engine, a plurality of features from most recently used (MRU) user files in a folder of a local file system, the plurality of features comprising at least one of file names, position of files in each folder, file size, date of modification, date of creation, size, author, heading, number of paragraphs, frequency of used Named Entities (NE), and categories of Named Entities;

converting, by the deep learning engine, the plurality of features into a vector format using vectorization tools configured to handle heterogeneous metadata and content features;

estimating, by the deep learning engine, an error between the vectorized features and a target vector based on a learned profile of user file characteristics derived from the plurality of features of MRU user files, wherein the error is computed based on entropy difference between an original MRU user file and a candidate decoy file;

generating, by the deep learning engine, one or more decoy files having entropy matching that of the MRU user files, if the error is less than a predefined threshold; and periodically updating, by the deep learning engine, the one or more decoy files or upon changes in user files in the folder of a local file system.

2. The method of claim 1, comprising:

creating decoy processes, by the deep learning engine, wherein the decoy processes comprise accessing the decoy files randomly and making them appear as recently accessed files to misdirect ransomware attacks.

3. The method of claim 2, comprising:

creating, by the deep learning engine, fake user accounts with administrator rights to misdirect ransomware attacks; and implementing a trap layer on a file system that makes use of the one or more decoy files, the decoy processes, and the fake user accounts to identify the ransomware infection.

4. The method of claim 1, comprising:

creating, by the deep learning engine, fake user accounts with administrator rights to misdirect ransomware attacks.

5. The method of claim 1, comprising:

monitoring runtime suspicious behaviour for identifying ransomware attack, wherein the monitoring comprises:

alerting on detection of suspicious activity; and triggering a rollback mechanism, wherein file backups are initiated to control spread of infection to other files or backups.

6. The method of claim 1, wherein the user files are at least one of .doc, .docx, .xls, .xlsx, .ppt, .pptx, .rtf, .odt, .ods, .odp, PDF, .JPG, .PNG, raw camera files, .txt, .RTF, etc., .sql, .dba, .mdb, .odb, .db3, sqlite3, .zip, .rar, .7z, .pst, .pem, and .crt.

7. A system for generating decoy files for protection against ransomware attacks, the system comprising:

a processor; and a memory communicatively coupled to the processor, the memory comprising a deep learning engine configured to:

extract a plurality of features from most recently used (MRU) user files in a folder of file names, position of files in each folder, file size, date of modification, date of creation, size, author, heading, number of paragraphs, frequency of used Named Entities (NE), and categories of Named Entities;

convert the plurality of features into a vector format using vectorization tools configured to handle heterogeneous metadata and content features;

estimate an error between the vectorized of the plurality of features and a target vector based on a learned profile of user file characteristics derived from the plurality of features of MRU user files, wherein the error is computed based on entropy difference between an original MRU user file and a candidate decoy file;

generate one or more decoy files having entropy matching that of the MRU user files if the error is less than a predefined threshold; and periodically update the one or more decoy files or upon changes in user files in the folder of a local file system.

8. The system of claim 7, wherein the deep learning engine is configured to trigger creation of decoy processes, wherein the decoy processes comprise accessing the decoy files randomly and making them appear as recently accessed files to misdirect ransomware attacks.

9. The system of claim 7, wherein the deep learning engine is configured to trigger creation of fake user accounts with administrator rights to misdirect ransomware attacks.

\* \* \* \* \*